United States Patent [19]

Board, Jr.

[11] 3,950,599

[45] Apr. 13, 1976

[54] BEARINGS WITH LOW-FRICTION LAMINATE LINER

[75] Inventor: David A. Board, Jr., Laconia, N.H.

[73] Assignee: New Hampshire Ball Bearings, Inc., Laconia, N.H.

[22] Filed: Feb. 21, 1974

[21] Appl. No.: 444,340

[52] U.S. Cl. ............ 428/236; 308/238; 308/DIG. 7; 308/DIG. 8; 428/255; 428/289; 428/422; 156/278

[51] Int. Cl.² .................. F16C 27/00; B32B 27/02

[58] Field of Search .............. 161/92, 98, 189, 257; 308/238; 117/26, 33; 428/236, 255, 288, 289, 422, 423

[56] References Cited

UNITED STATES PATENTS

| 2,862,283 | 12/1958 | Rasero ................ 161/189 |
| 3,084,085 | 4/1963 | Ronay ................ 161/98 |
| 3,097,060 | 7/1963 | Sullivan .............. 308/238 |
| 3,250,556 | 5/1966 | Couch et al. ........ 308/238 |
| 3,331,730 | 7/1967 | Beam et al. ......... 161/257 |
| 3,429,627 | 2/1969 | Freund ............... 308/238 |
| 3,459,579 | 8/1969 | Newman .............. 117/33 |
| 3,741,855 | 6/1973 | Harrison ............. 161/189 |
| 3,825,982 | 7/1974 | DeLavalette et al. ... 308/238 |

FOREIGN PATENTS OR APPLICATIONS

| 1,575,362 | 1/1970 | Germany ............. 308/238 |
| 613,595 | 12/1970 | Italy ................. 161/189 |

Primary Examiner—George F. Lesmes
Assistant Examiner—R. J. Roche
Attorney, Agent, or Firm—Richard P. Crowley

[57] ABSTRACT

A laminate liner adapted to be secured to a supporting surface, which liner comprises in combination: a backing sheet member characterized by a number of relatively large openings therein; a fibrous polymeric sheet material characterized by a number of small openings therein, the fibers composed of a thermoplastic polymeric material having low-friction, self-lubricating properties; and a hardenable resin binder material, the hardenable resin binder material impregnated into the openings of the backing member, and the fibrous polymeric sheet material compressed into the openings of the backing member to form an integral, unitary, laminate liner, the liner characterized by having a low-friction facing surface composed of the polymeric sheet material compressed and bonded to the backing member, and a resin-rich backing surface, the backing surface adapted to be secured by heat pressure to a supporting surface to form a bearing liner.

7 Claims, 4 Drawing Figures

BEARINGS WITH LOW-FRICTION LAMINATE LINER

BACKGROUND OF THE INVENTION

Plastic liners characterized by a facing surface of a low coefficient of friction and suitable for use as bearing liners have been prepared by a number of techniques. Typically, such liners are employed by securing the laminate lining to a reinforcing or supporting surface, such as a roughened surface of a bearing, wherein the liner serves as a bearing liner. The liner is bonded to the supporting surface employing a thermosetting resin material. The facing surface of the liner typically contains a plastic having low-friction properties which impart a low-friction facing surface to the bearing liner. Such facing surfaces are typically composed in part of a low-friction polymeric thermoplastic material, such as a fluorocarbon resin like tetrafluoroethylene (TFE). Such polymeric materials permit low-friction sliding, rotational or other contacting engagement or movement between two parts. For example, such liners with such resins have been found particularly useful between the ball and the race of a ball joint, in plane journal bearings wherein the liner is secured to the inside diameter of the cylindrical journal, in rod end bearings and in other devices where low friction between sliding, rotating or contacting parts is desired.

In the past, bearing liners have been prepared wherein the liner is composed of a combination of low-friction polymeric strands and resin-bondable strands interwoven together; for example, the use of tetrafluoroethylene resin strands and cotton or glass fibers which have been interwoven together and used in bearing liners. The bearing facing surface is normally composed primarily of the low-friction polymeric strands, while the opposite or backing surface is normally composed primarily of the resin-bondable strands. A thermosetting-type resin is then employed to impregnate the bondable strands, and the resulting liner is then resin-bonded under heat and pressure to the desired bearing surface. In this type of bearing liner, the facing surface derives its low-friction properties from the presence of the interwoven polymeric strands (see U.S. Pat. Nos. 2,885,246; 2,907,612; and U.S. Pat. No. Re. 24,765), Other bearing liners have been prepared employing a facing surface composed of low-friction suspended or powdered polymeric particles dispersed in a resin binder with or without the presence of low-friction strands, wherein various molding compositions employed have bearings (see U.S. Pat. Nos. 3,471,207; 3,533,668; and 3,594,049). In addition, several techniques have been used to prepare various bearing liners, including the use of adsorbent sheet materials adjacent a low-friction facing surface of polymeric strands to avoid excess resin adhesive being forced onto the facing surface during their manufacture (see U.S. Pat. No. 3,055,788), while other techniques use a lamination manufacturing method which includes a graphite tissue impregnated with tetrafluoroethylene resin sheet material (see. U.S. Pat. No. 3,501,360). Prior art liners and their use as bearing liners and their manufacture have not been wholly satisfactory, and, as evidenced by the continuous modifications made to such liners and bearings in the field, improved liners and bearings which require less initial wear-in time and better wearing life, which are thinner or possess other desirable characteristics are constantly being sought.

SUMMARY OF THE INVENTION

My invention relates to an improved liner having a lowfriction facing surface, to bearings containing such liners, to the method of preparing such liners and bearings. In particular, my invention concerns an improved compact, thin, laminate-type liner characterized by a fine, fibrous, polymeric, low-friction facing surface and a resin backing surface, which liner is particularly useful and adaptable as a bearing liner, and to the method of manufacturing such laminate liner. More particularly, my invention is directed to a laminate liner and the use of the laminate liner as a bearing liner which has several distinct and important advantages over past bearing liners. My bearing liners prepared by the use of my liners are characterized by low initial wear times to develop a good bearing contact, excellent liner bond strength, thin, compact and dense laminate liners, improved wear life and low permanent set characteristics after compression-loading of the liners, as well as other advantages as will be fully set forth.

I have discovered a unique laminate liner which is useful as a bearing liner, which laminate liner is composed of a backing sheet member having a plurality of openings therein, such as a woven sheet material having relatively large, uniform weave openings therein; a porous, fine, fibrous, polymeric sheet material composed of a thermoplastic polymeric material characterized by low-friction properties, such as a thin, porous, nonwoven sheet material of tetrafluoroethylene resin; and a hardenable binding material, all of which are compressed and formed into a unitary laminate liner.

My laminate liner is particularly characterized by having a smooth facing surface composed of the low-friction fibrous materials and a binder-rich backing surface. The smooth low-friction facing surface of my laminate liner provides for improved wear and for lower initial wearing in time, while the binder-rich resin backing surface permits the laminate liner to be secured easily and effectively to a bearing surface. My laminate liner is formed by compressing with heat, so as to force the fibrous, polymeric, thermoplastic sheet material into the openings of the backing sheet member, and to secure the polymeric sheet material to the backing sheet member, and to force the liner material into the openings of the backing sheet member. Sufficient heat, pressure and process conditions are employed so as to obtain a thin; for example, less than 20 mils in thickness, dense, unitary laminate liner, with the binder-rich resin backing surface adapted to be hardened further under compression conditions so as to enable it to be bonded to a bearing or other supporting or reinforcing surface.

The backing sheet member useful in my liner should be a porous, flexible sheet material having openings therein sufficient to provide pocket-like areas wherein the polymeric material of the polymeric sheet member can be compressed into and be contained by the fibers of the backing sheet. The backing sheet member may be woven or nonwoven or otherwise formed, but preferentially, the backing sheet is composed generally of regular and uniform openings, such as is found in a mesh of natural glass or plastic fibers or metallic screens, such as a sheet member having rectangular openings. It is desirable further to have such openings considerably larger than the pores of the polymeric sheet material, and normally, such openings would number from about 10 to 45 openings per linear inch. The backing sheet member is normally composed of many individual strands, not in the twisted or braided condition, but such strands being made up of numerous fibers, and which backing member with the binder material serves as a structural load-carrying element.

The fibrous polymeric sheet material employed in my liner should be composed of fine fibers of the polymer, either in woven or preferably in nonwoven form, with the polymeric sheet composed of many fine pores and subject to be compressed so that the fine fibers will flow under such compression into the openings of the sheet material and impregnate the backing sheet material. I have found that homogeneous solid sheet materials composed of the polymeric material are not suitable for use in preparing my laminate liners in that such solid polymeric materials, even though having low-friction properties and being self-lubricating, do not have sufficient resistance to shearing forces and are subject to cold flow during use, and, therefore, the polymeric sheet material should be comprised and consist essentially of polymeric fibers, such as, for example, of 10 to 100 microns in diameter.

The polymeric material should be porous and typically have a large pore volume in comparison to the total volume of the sheet; for example, typically over 50%, such as 60 to 95% pore volume, but which, of course, during formation of my laminate liner, is compressed, with a corresponding reduction in pore volume. The pore size of the polymeric sheet material should be significantly smaller than the openings of the backing sheet, and may range, for example, from about 10 to 100 microns, but more typically is from 40 to 60 microns. Higher porosity of the polymeric sheet material is undesirable, since, during compression and manufacture of the laminate liner, high porosity might permit the resin to flow excessively through the pores and onto the facing surface. The preferred polymeric sheet material thus comprises a low-friction facing surface composed of a porous, fine, fibrous, paper-like sheet of a fluorocarbon resin which presents an extremely smooth facing-wear surface on the bearing liner.

The thickness of the backing member and the polymeric sheet material may vary, depending upon the desired ultimate thickness of the laminate liner. My discovery permits the preparation of a very thin laminate liner, which liner is dense and compact, but permitting its employment as a bearing liner in a number of applications where such thin, compact dense liners are desirable. My laminate liners are typically prepared in having a total thickness ranging from about 8 to 20 mils and depend upon the thickness of the backing sheet and polymeric sheet employed, as well as the degree of compression desired or required in order to provide the desired properties bearing loads and compressive stresses. The polymeric sheet material having a high pore volume; that is, an expanded-type fibrous sheet, is often compressed to more than 50% of its original thickness; say, from 50% to 80% during the compression step, whereby the polymeric liner is forced into the fibers and openings of the backing member. The thickness of the backing member and the polymeric sheet is often selected to be about the same or to vary only slightly, with the thickness of the polymeric sheet being selected to be sufficient to permit the polymeric material on compression to impregnate the backing member to form a mechanical bond by an entrainment of the compressed polymer.

The polymeric material employed in the polymeric sheet member may be selected from a number of thermoplastic polymeric resins which are capable of being formed in fine fibrous form and which exhibit in such form self-lubrication and/or low-friction properties. The polymeric material selected should be such as to be capable of being compressed and cold-flowed under the heat and pressure conditions required to prepare my laminate liner and later to provide sufficient rigidity so as to prevent cold flow or deformation during use as the facing surface of the bearing liner. Typical polymers suitable for such use include olefinic-type resins, as well as halocarbon resins such as fluorocarbons, and more particularly, polymers such as polytetrafluoroethylene (TFE) commonly known as Teflon, and fluorinated ethylenepropylene resin (FEP) generally referred to as fluorocarbons or fluoroplastics.

The binder material employed in my laminate liner may consist of any adhesive material which fills and binds the backing member and the polymeric sheet together. The binder material should be such as to impregnate the backing member during compresson and to act as a filler to help carry the bearing loads and compressive stresses of the laminate liner, and to act as a bonding agent to bond the vinyl laminate to the supporting or reinforcing surface of the bearing when the laminate liner is employed. The liner material should be adapted to secure the binder-rich backing surface to a bearing surface which may be of metal or plastic.

A number of resinous-type materials may be employed as the adhesive binding material in my laminate, such as resin material which are one-component, B-staging, thermosetting-type adhesive materials, either in bulk or in a solvent. For example, the binder material may comprise a thermosetting-type material which is subject to thermoset, cross-linking or hardening through the use of pressure or heat or both, such as, for example, the employment of epoxy resins, urethane resins and phenolic resins or modifications thereof, such as hardenable cross-linkable vinyl-phenolic resins. The binder material used is not fully thermoset or cross-linked during the initial compression and heating step to form the laminate liner, but is in a hardenable condition so that it may be subsequently joined to the surface of the bearing line.

The method of preparing my laminate liner provides for a liner material, such as a phenolic resin, to be primarily on the backing surface of the backing member; that is, to provide for a resin-rich, hardenable, B-staging, thermoset phenolic resin on the backing surface which permits the B-staging resin to bond the backing surface to a roughened surface of a bearing upon the application of heat and pressure. In one embodiment, I have found that a phenolic resin subject to hardening and cross-linking is particularly useful as a binder material, which resin is applied in a series of coating layers to the backing member in a volatile solvent, the solvent being removed by drying prior to compression to form the laminate liner. The number and types of coating layers of the binder material to be applied may vary. The binder material should fill in the openings of the backing member prior to the compression into the laminate liner, and typically, a sufficient layer of binding material is applied in successive coatings to cover the backing member surface.

My laminate liner is prepared by compressing under low heat conditions the backing member, the polymeric sheet member and the adhesive binder material together under such conditions such that the thermoplastic polymeric sheet material is impregnated and forced into the open weaves of the backing and is mechanically secured thereto, and the adhesive binder material is also forced into the open members of the backing member to form an integral unitary liner with a facing surface of low-friction characteristics and a backing surface containing a binder material which may be secured to a bearing surface. Typically, the pressure and heat conditions employed are such as to go to a B-stage of the binder material such that the binder material may be subsequently joined to a supporting surface through the use of pressure and additional heat through cross-linking continuation of condensation or polymerization or other reactions providing a hard thermoset bonding binder material. For example, in one embodiment when the adhesive binder material comprises a solvent-based, cross-linkable, condensable resin, the backing member and the polymeric sheet material are joined, filled with resin, dried to remove solvent volatiles and compressed to reduce thickness and increase the density. Vinyl lamination and bonding of the liner laminate so prepared to a bearing support member is effected with heat and pressure through the use of the hardenable resin backing surface of the liner laminate.

The amount of pressure employed should be sufficient to reduce the laminate liner to the desired thickness. Typically, the laminate liner is reduced from 40% to 60% at pressures, for example, from about 500 to 1,500 psi. at temperatures typically under 160°F, such as 130° to 155°F. In the process for preparing my laminate liner, a release surface, such as release strips, are employed on either side of the backing member adhesive layer and polymeric sheet, and the entire assembly placed in a mold under pressure and the mold heated. After forming the laminate liner, these sheets, which typically may be solid polymeric sheet materials, such as of tetrafluoroethylene resin, are removed from the facing and backing surfaces of the laminate liner, and, thereafter, the laminate liner is cut into the desired shape for application to the supporting surface.

The bearing surface or other surface to be lined with the laminate liner is prepared as usual by cleaning the surface, sand blasting, cleaning, drying, applying a prime coat of adhesive material, typically, but not always, the same type of adhesive material employed in the laminate liner, B-staging the prime coat of resin so used to bring it to the same condition as the material in the backing surface of the laminate liner, placing the liner on such surface containing the prime coat, and then heating the entire assembly under pressure to effect the crosslinking of thermoset and bonding of the backing surface of the laminate liner to the bearing or supporting surface.

Bearing liners prepared by my process result in a thin, dense, resin-rich liner with a high compressive modulus of elasticity. Such a liner may be characterized by an improved wear surface, because the resinimpregnated polymeric material with its woven structural support or backing member results in an extremely smooth facing wear surface, which eliminates most of the usual rapid wear characteristics of 0.002 to 0.004 inches before full bearing contact is made in use.

The method of laminating further provides for an improved and simplified self-lubricating-type laminate liner construction containing uniformity of the self-lubricating or low-friction pockets in the laminate liner, and the polymeric content of the same, because of the technique of lamination; that is, the openings of the backing member contain uniform and regular amounts of the polymeric material. For example, laminate liners and bearing liners prepared by my method typically have a longer wear life on the facing surface under higher loading conditions than prior art bearings, and meet the wear limits, for example, of specifications MTL-B-81820. My laminate liners avoid the expense and difficulties of interweaving tetrafluoroethylene fibers with other resin-bondable fibers, and also do not require the dispersion of tetrafluoroethylene resin particles, either in the resin or on the facing surface.

DESCRIPTION OF THE EMBODIMENTS

Figure 1:
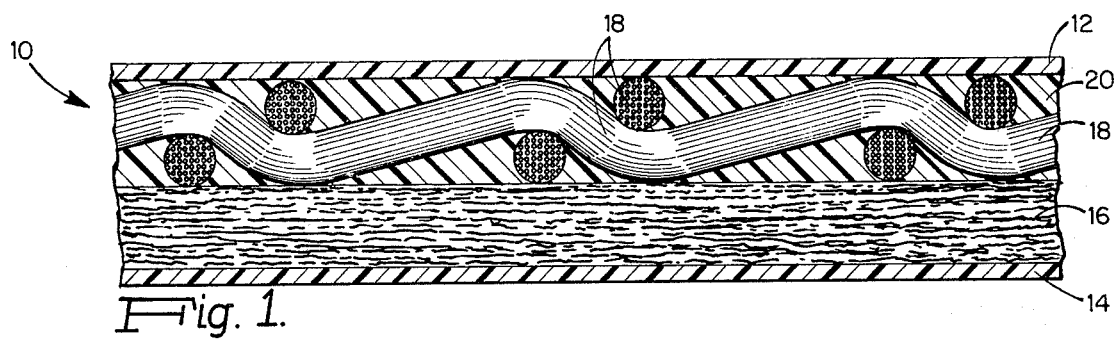
FIG. 1 is a schematic cross-sectional representation of a layup of my llaminate binder prior to compression of the binder into a laminate liner.
Figure 2:
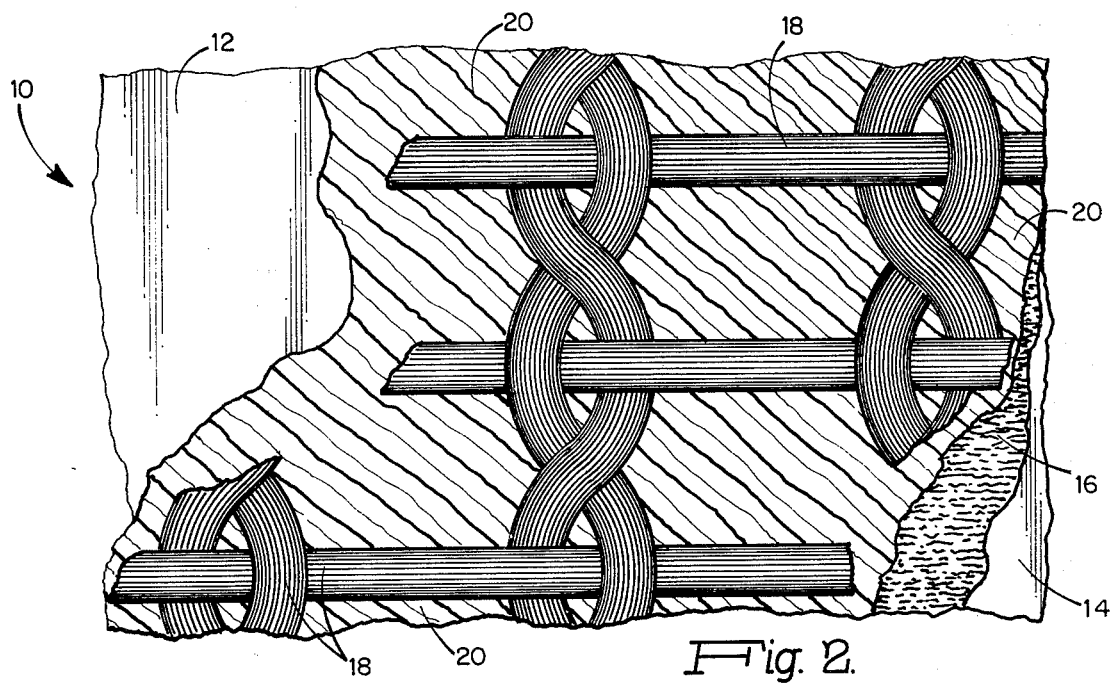
FIG. 2 is a schematic elevational view of the end cross section of the components of the liner of FIG. 1.

FIGS. 1 and 2 show a laminate layer 10 composed of a nonwoven fibrous paper thin sheet of tetrafluoroethylene fibers 16, a woven backing sheet 18, a resin binder material 20 between two solid release surface sheets of tetrafluoroethylene 12 and 14. The nonwoven sheet 16 comprises a finely woven sheet of tetrafluoroethylene fibers bonded at their crossover points having a pore volume of about 80% prior to compression, with a pore size of about 45 microns and a thickness of about 8 mils. The sheet material is known as Zitex, a registered trademark of Chemplast, Inc. Wayne, N.J. The backing sheet member 18 is composed of a woven sheet of nylon strands, each strand containing a number of nylon fibers therein, and presenting an open rectangular weave, with the individual strands not twisted or braided. The backing sheet has a thicknss of about 10 mils and rectangular openings, about 25 openings per linear inch. The binder material 20 is a one-component B-stage thermosetting adhesive material which is comprised of a vinyl phenolic resin and a volatile solvent, such as methylethyl ketone and ethanol, a hydrocarbon diluent, such as toluene, the resin adapted to be cured, cross-linked or otherwise hardened at elevated temperatures, the resin material 20 applied in successive coats onto the backing material as hereinafter more fully described. Release sheets 12 and 14 are composed of solid sheets of a tetrafluoroethylene resin, which release sheets are adapted to be stripped from the facing and backing surfaces of the laminte liner after laminate of the liner. The total weight of resin binder material 20 applied to the liner varies as desired, but typically, ranges from about 15 to 20 grams per square foot. The adhesive layer 20 typically would cover the backing material.

Figure 3:
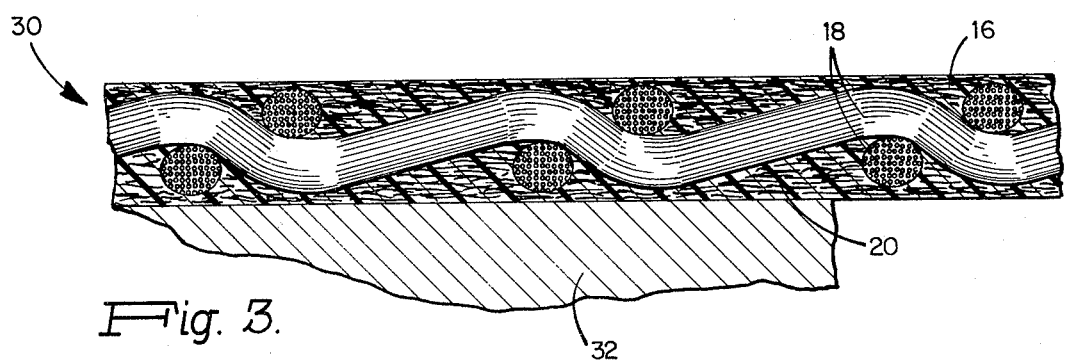
FIG. 3 is a schematic cross-sectional view of my laminate liner employed as a bearing liner on a supporting surface.

FIG. 3 illustrates my laminate liner as a bearing liner 30 and in a compressed state, and characterized by a low-friction, self-lubricating-type facing surface composed of the compressed fine fibers of the tetrafluoroethylene resin of the sheet 16, and impregnated into the openings of the backing member 18, and with the resin binding material 20 in a hardened state, the resin holding the sheet components of the bearing liner together, acting as a filler to help carry the bearing loads under compressive stressing, and acting as the bonding agent at the resin-rich backing surface to bond the entire laminate liner to a supporting surface 32, such as a supporting surface of steel such as in a bearing liner. The total thickness of the bearing liner as illustrated is approximately 9 to 11 mils, with the resin material in its cross-linked or hardened bonding stage.

Figure 4:
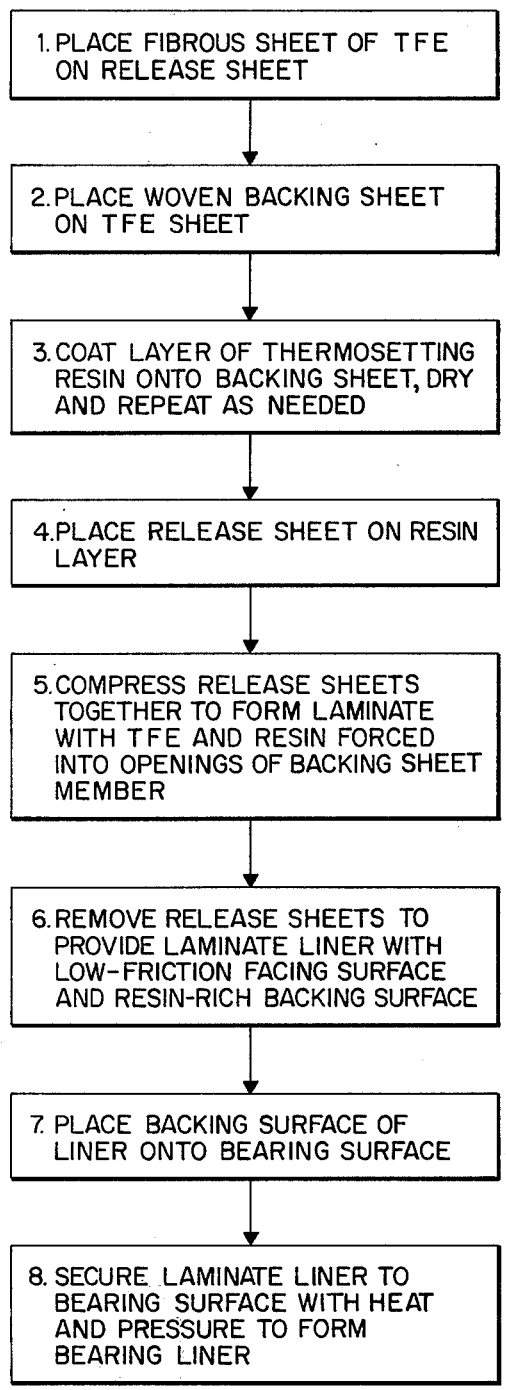
FIG. 4 is a schematic top flow process diagram illustrating the process steps for preparing a bearing liner of my invention.

FIG. 4 is a schematic illustration of the process steps employed in one embodiment for preparing my laminate liner and the preparation of the liner as a bearing liner. In the process, the fibrous polymeric sheet 16 is placed on a release sheet 14, and then the backing member 18 is placed on top of the fibrous sheet 16. Successive layers of the vinyl phenolic resin binding material 20 in a volatile solvent is then coated onto the backing sheet 18, with an approximate 10 to 20-minute dry cycle at room temperature between each coating layer to permit the escape of the volatile solvent. Thereafter, each layer is subject to about a 10 to 20-minute oven cure at 160°F, plus or minus 5°F, between each coating layer. A release sheet 12 is then placed on top of said layer when sufficient adhesive material 20 has been so coated, and the laminate liner assembly 10 is then compressed in a thickness of approximately 19 to 21 mils to a thickness of 12 to 14 mils, while heating in a heat-press under about 1,000 pounds per square-inch pressure and a temperature of 140° to 160°F; for example, 150°F, to form the laminate liner. After removal from the heat-press, the release sheets 12 and 14 are stripped from the facing and backing surfaces of the laminate liner, and the laminate liner is then cut to the desired size and shape to be employed as a bearing liner. The hardenable resin-rich backing surface of the laminate liner so prepared is then based onto a prepared bearing surface 32, and the laminate liner secured to the bearing surface under heat and pressure to form a bearing liner. Bonding of the laminate liner as a bearing liner is accomplished employing heat and pressure conditions of 300° to 350°F and about 100 to 300 pounds per square-inch pressure for a period of time of 2 to 4 hours.

My laminate liner and bearing liner prepared as set forth above have been compared to prior art liners composed of tetrafluoroethylene resin and glass fibers interwoven, as, for example, set forth in the White patent. In such comparative tests, my liner has shown considerably lower initial wearing period before a good bearing contact is established, and has shown longer wear life under higher loading conditions. For example, in comparative tests, the following typical data has been obtained as set forth in Table I.

TABLE I

| Bearing Liner Wear Versus Life Cycles* | | | |
|---|---|---|---|
| Prior Art TFE/Glass Interwoven Liner | | Liner of Example | |
| No. of cycles | Liner wear inches | No. of cycles | Liner wear inches |
| 1,000 | 0.0043 | 1,000 | 0.0020 |
| 10,000 | 0.0053 | 10,000 | 0.0025 |

TABLE I-continued

| Bearing Liner Wear Versus Life Cycles* | | | |
|---|---|---|---|
| Prior Art TFE/Glass Interwoven Liner | | Liner of Example | |
| No. of cycles | Liner wear inches | No. of cycles | Liner wear inches |
| 25,000 | 0.0058 | 25,000 | 0.0028 |

*Bearing Size ATW 8V10
Oscillating load 14,950 lbs. (37,300 psi. reference)
Angle ± 25°
Speed 10 CPM
Temperature 25°C dry I have thus described my laminate liner and bearing liner in its preferred embodiment. However, it is recognized that many changes, modifications and substitutions may be made by one having ordinary skill in the art without necessarily departing from the spirit and scope of the invention.

What I claim is:

1. A bearing device which comprises a bearing support surface and a laminate as a bearing liner secured to the bearing support surface, which laminate comprises:
   a. a flexible woven backing sheet material;
   b. a flexible, nonwoven, porous, thin, polymeric sheet material consisting essentially of a fibrous thermoplastic polymeric fluorocarbon material having low-friction, self-lubricating properties;
   c. a hardened, thermoset resin binder material;
   d. the backing sheet material characterized by a plurality of substantially regular and uniform, relatively large openings thereon having from about 10 to 45 openings per linear inch;
   e. the polymeric sheet material characterized by a plurality of small pores therein up to about 100 microns and a pore volume of over about 50 percent;
   f. the polymeric sheet material compressed into the openings of the backing sheet material and mechanically secured as a face surface to the backing sheet material;
   g. the resin binder material impregnated into the openings of the backing sheet material and the pores of the compressed polymeric sheet material, the resin material and the backing sheet material adapted to serve as a structural load-carrying element; and
   h. the compressed polymeric sheet material and the impregnated resin material in the backing sheet providing an internal laminate liner having a facing surface of compressed fibrous polymeric material essentially free of resin thereon, and a hardened, resin-rich backing surface secured to the supporting surface to form a low-friction bearing liner.

2. The laminate of claim 1 wherein the polymeric sheet material is characterized by pores of from about 10 to 100 microns.

3. The laminate of claim 1 wherein the polymeric sheet material is a polytetrafluoroethylene resin or a fluorinated ethylene-propylene resin.

4. The laminate of claim 1 which has a thickness of from about 8 to 20 mils.

5. The laminate of claim 1 wherein the polymeric sheet material has a pore volume of from about 60 to 95 percent.

6. The laminate of claim 1 wherein the backing sheet material is a woven nylon sheet material.

7. The bearing device of claim 1 which comprises a metal, load-supporting surface, and wherein the backing sheet material is a woven nylon sheet material characterized by about 25 openings per linear inch, the polymeric sheet material is a tetrafluoroethylene resin characterized by a pore volume of over about 80 percent and pores of about 45 microns.

* * * * *